(12) United States Patent
Zhou et al.

(10) Patent No.: US 7,067,449 B2
(45) Date of Patent: Jun. 27, 2006

(54) Y-ZEOLITE-CONTAINING COMPOSITE MATERIAL AND A PROCESS FOR PREPARING THE SAME

(75) Inventors: Jihong Zhou, Beijing (CN); Enze Min, Beijing (CN); Haiying Yang, Beijing (CN); Baoning Zong, Beijing (CN)

(73) Assignee: China Petroleum & Chemical Corporation, Beijing (CN)

( * ) Notice: Subject to any disclaimer, the term of this patent is extended or adjusted under 35 U.S.C. 154(b) by 61 days.

(21) Appl. No.: 10/809,345

(22) Filed: Mar. 26, 2004

(65) Prior Publication Data

US 2004/0266607 A1 Dec. 30, 2004

(30) Foreign Application Priority Data

Mar. 28, 2003 (CN) ................................ 03 1 21159

(51) Int. Cl.
*B01J 29/06* (2006.01)
(52) U.S. Cl. ............................. 502/79; 502/64; 502/68; 502/65; 502/73
(58) Field of Classification Search ................. 502/64, 502/68, 65, 73, 79
See application file for complete search history.

(56) References Cited

U.S. PATENT DOCUMENTS

| | | | |
|---|---|---|---|
| 3,119,659 A | | 1/1964 | Taggart et al. |
| 3,506,594 A | * | 4/1970 | Dzierzanowski et al. ..... 502/68 |
| 3,574,538 A | | 4/1971 | McDaniel et al. |
| 3,639,099 A | | 2/1972 | Elliot, Jr. et al. |
| 3,671,191 A | | 6/1972 | Maher et al. |
| 4,166,099 A | | 8/1979 | McDaniel et al. |
| 4,493,902 A | | 1/1985 | Brown |
| 4,631,262 A | * | 12/1986 | Altomare ..................... 502/65 |
| 4,965,233 A | * | 10/1990 | Speronello .................... 502/65 |
| 5,023,220 A | * | 6/1991 | Dight et al. .................. 502/65 |
| 6,362,123 B1 | * | 3/2002 | Tsao et al. ..................... 502/74 |
| 6,696,378 B1 | * | 2/2004 | Gibson et al. ................ 502/79 |
| 2003/0199386 A1 | * | 10/2003 | Stockwell et al. ............ 502/68 |
| 2004/0235642 A1 | * | 11/2004 | Xu et al. ...................... 502/68 |

FOREIGN PATENT DOCUMENTS

| | | |
|---|---|---|
| CN | 1334142 | 2/2002 |
| CN | 1334318 | 2/2002 |
| CN | 1393402 | 1/2003 |
| EP | 0189267 | 7/1986 |
| EP | 0209332 | 1/1987 |
| GB | 1277458 A | 6/1972 |
| RU | 2180320 C1 | 3/2002 |
| WO | 03/020423 | 1/2003 |
| WO | 95/12454 | 3/2003 |
| WO | 03/054114 | 7/2003 |

OTHER PUBLICATIONS

English Language Abstract of CN 1393402, Publish ed Jan. 29, 2003.
G. Dawei et al., Petroleum Refining, 1983, vol. 7, pp. 12-16.
Rajagopal, Appl. Catal., 1986, vol. 23, pp. 69-80.

* cited by examiner

*Primary Examiner*—Christina Johnson
(74) *Attorney, Agent, or Firm*—Birch, Stewart, Kolasch & Birch, LLP

(57) ABSTRACT

A Y-zeolite-containing composite material made from materials comprising kaolin by in-situ crystallization, said composite material comprises nest-like structure. Content of Y-zeolite is in the range of 30–85% by weight of said composite material. The nest-like structure is essentially comprised of rodlike crystal, further comprises flaky crystal or blocky crystal. Y-zeolite in the composite material may be HY, REY, or REHY. Said composite material is suitable to be used as catalysts for catalytic cracking of heavy oil or resid. The invention further relates to a process for preparing the composite material.

19 Claims, 3 Drawing Sheets

Y-ZEOLITE-CONTAINING COMPOSITE MATERIAL AND A PROCESS FOR PREPARING THE SAME

This application claims priority under 35 U.S.C. §119 of Chinese Application No. 03121159.3, filed Mar. 28, 2003.

BACKGROUND OF THE INVENTION

1. Field of the Invention

The present invention relates to a Y-zeolite-containing composite material made from materials comprising kaolin by in-situ crystallization and a process for preparing the same.

2. Description of the Related Art

Study on the synthesis of zeolite with kaolin as a raw material has been going on since U.S. Pat. No. 3,119,659 disclosed such a process in 1964. Early work mainly focused on the synthesis of pure zeolite, e.g. U.S. Pat. No. 3,574,538 disclosed a process for synthesizing Y-zeolite from kaolin, which comprised calcining kaolin to form amorphous metakaolin, adding a certain amount of sodium silicate and sodium hydroxide to make the mole ratio of silica/alumina approach that of the zeolite to be synthesized, then adding 0.1–10% by weight of guide agent, and conducting crystallization at 60–110° C. to yield highly pure zeolite with a silica/alumina ratio of 4.5–5.95 by mole.

EP 0209332A, discloses a process for crystallizing kaolin material to prepare Y-zeolite under stirring, which comprises calcining kaolin at 550–925° C. to yield metakaolin, then adding sodium compound and water, adjusting silica to alumina ratio to 2.1–15: 1 by mole and water to sodium oxide ratio to 15–70: 1 by mole, optionally adding a guide agent to the feed, and crystallizing the reactant to form Y-zeolite under stirring, The synthesized Y-zeolite is dispersive powder with an average diameter of 3 μm and a NaY purity of 97%.

Y-zeolite is prepared from kaolin (Gao Dawei et al, Petroleum Refining, 1983 (7): 12–16) by calcining kaolin at a relatively low temperature, e.g. 640–660° C., into metakaolin, then adding sodium hydroxide, a guide agent, and water glass, aging at 50–60° C. for 1 hour, and crystallizing at 98–100° C. for 2–24 hours. After drying, NaY zeolite with a crystallinity of higher than 80% and a silica/alumina ratio of higher than 4.5 by mole is obtained. This zeolite exhibits high hydrothermal stability after exchanging with rare-earths.

CN 1334142A calcines a part of kaolin raw powder at 940–1000° C. into spinel-containing kaolin and calcines another part at 700–900° C. into metakaolin, and then mixes the two parts of calcined kaolin in a certain ratio, adds sodium silicate, guide agent, sodium hydroxide, and water, crystallizes at 90–95° C. for 16–36 hours, yielding a molecular sieve containing 40–90% of NaY after drying. Since the temperature for calcining kaolin in preparing the molecular sieve in this process exceeds 700° C., the energy consumption is high and the obtained molecular sieve is not a nanometer level product.

Since Y-zeolite is an active component of fluidized bed catalytic cracking catalyst, researchers expected to directly make kaolin into microsphere, and then into Y-zeolite by in-situ crystallization. U.S. Pat. No. 4,493,902 discloses a microsphere zeolite containing at least 40% of NaY by calcining fine kaolin particle, mixing with kaolin to form a slurry, spray drying to form microsphere, calcining again to convert kaolin to metakaolin, adding the raw materials for synthesizing zeolite and guide agent, and crystallizing under stirring and heating. This zeolite may contain spinel obtained by calcining kaolin at high temperatures and the presence of spinel provide a stable "framework" for the growth of zeolite. Therefore, a zeolite with high activity, selectivity, hydrothermal stability, wear resistance, and antimetal ability can be obtained.

CN 1334318A discloses a zeolite having a low content of NaY, only 25–35%, and having a mole ratio of silica/alumina of 4.0–5.5 by mixing kaolin and a binder, spray drying the mixture to form microsphere having a diameter of 20–111 μm, calcining a part of microsphere at 940–1000° C. into kaolin and calcining another part at 700–900° C. into metakaolin, mixing the kaolin and metakaolin, adding sodium silicate, guide agent, sodium hydroxide and water, crystallizing at 98–100° C. for 16–36 hour.

In recent years, the variation in the structure of petrochemical industry products and price of petroleum products requires the development of the petroleum refining industry towards the direction of deep processing, and the technology for catalytic cracking of heavy oils has become an important path to increase the economic benefit. The crystal size of conventional Y-zeolite is generally in a range of 0.8–1.2 μm, which cannot allows larger molecules of resid with diameters greater than 1.0 nm to enter the pore of zeolite with diameters of only about 0.8 nm, and these molecules can enter the pore merely after adsorbing on the outer surface of the zeolite and cracking into smaller molecules. Therefore, the magnitude of the outer surface area of the zeolite becomes an important factor affecting the cracking of larger molecules of resid, but the increase of the surface area of zeolite means preparing zeolite with small crystal. Therefore, preparing Y-zeolite with small crystal to enhance the diffusion rate within crystal has gradually become a hotpot of research.

Rajagopal (Appl. Catal. 1986, 23:69) uses a microsphere catalyst made from synthesized zeolite with a crystal size of 60 nm to crack crude oil, and the result shows that zeolite with small crystal size produces more gasoline and light diesel oil, and less dry gas and coke deposit. However, smaller zeolite crystal size may result in poorer hydrothermal stability, more difficulty in filtering, higher surface energy and thereby a stronger tendency for the crystal to aggregate. Thus, the shortcoming of the gelling method in synthesizing NaY with smaller crystal size has become a greater obstacle to its industrialized application.

SUMMARY OF THE INVENTION

The objective of the present invention is to provide a Y-zeolite-containing composite material and a process for preparing the same. The composite material is made from materials comprising kaolin by in-situ crystallization. This composite material possesses the advantages of high hydrothermal stability, strong ability to resist coke deposition, and ease to filter the composite material obtained in preparing procedure.

In particular, the present invention is to provide a Y-zeolite-containing composite material, wherein said composite material comprises nest-like structure.

In a preferred embodiment, the composite material comprises Y-zeolite in the content of 30–85% by weight and matrix formed after crystallization of the materials comprising kaolin. More preferably the content of Y-zeolite is in the range of 30–70% by weight of composite material.

In another preferred embodiment, the nest-like structure is comprised of a least 70% of rodlike crystal, wherein said rodlike crystal has a diameter of 50–200 nm and a length of 100–600 nm. And the nest-like structure can further comprises flaky crystal or blocky crystal, wherein blocky crystal has an equivalent diameter of about 50–500 nm and flaky crystal has a thickness of about 50–200 nm. Said rodlike crystal, flaky crystal and blocky crystal are comprised of matrix formed after in-situ crystallization of the materials comprising kaolin and Y-zeolite on the surface of said matrix.

The present invention further provides a process for preparing a Y-zeolite-containing composite material, which process comprises calcining raw material powder comprising kaolin at lower temperatures into metakaolin and conducting in-situ crystallization under stirring. In preparing the composite material, calcination of kaolin at lower temperatures may effectively save energy. The primary particle of the obtained composite material is mainly rodlike crystal, and smaller Y-zeolite crystal grows on the surface of the primary particle with high dispersion, therefore the active component of the catalyst made from this Y-zeolite crystal may be effectively utilized. Besides, the composite material of the present invention comprises nest-like structure and may provides macropores, and the filtering of the composite material easier during preparation procedure.

DETAILED DESCRIPTION

Figure 1:
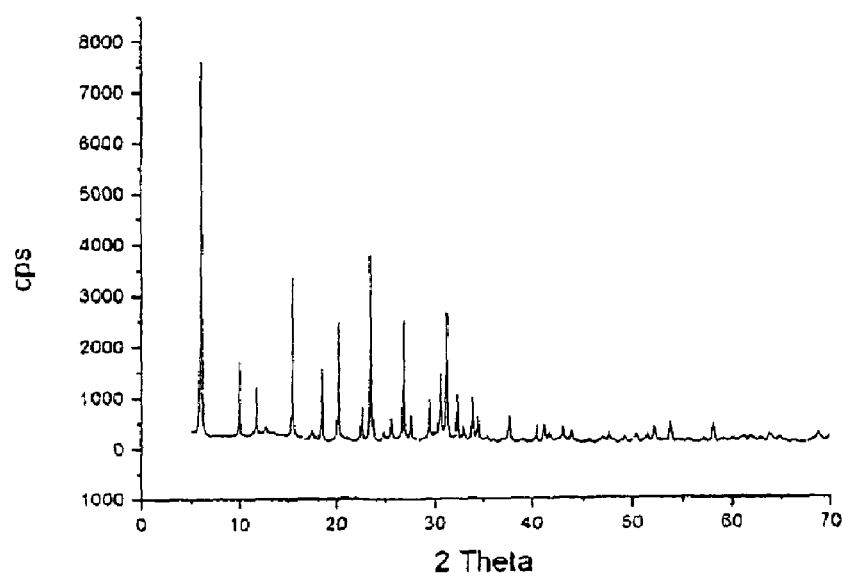
FIG. 1 is the X-ray diffraction pattern of the composite material of the present invention.

The composite material according to present invention is prepared by calcining raw material comprising kaolin at a lower temperatures to convert it into metakaolin, and then mixing metakaolin with sodium silicate, guide agent, solution of sodium hydroxide and water, and conducting in-situ crystallization of metakaolin under stirring and lower temperature. The substance remaining after in-situ crystallization of metakaolin forms amorphous silicon/aluminum matrix and the produced Y-zeolite after in-situ crystallization of metakaolin grows on the surface of said matrix. The crystal size of said Y-zeolite is in the range of 10–400 nm, preferably in the range of 10–100 nm. And said materials comprising kaolin is selected from hard kaolin or soft kaolin.

The composite material according to present invention comprises nest-like structure, especially nest-like sphere. The term "nest-like structure" used herein means a geometric structure similar to bird's nest in appearance crosswise piled up by rodlike, flaky, and blocky crystals. There are great numbers of gaps and pores, and nest passages inside the nest-like structure. Said pores with a diameter being about 200–1000 nm locate on the surface or interior of the nest-like structure. And the nest passages with a diameter being about 50–500 nm locate inside the structure. The equivalent diameter of said nest-like structure is in the range of about 1000–3000 nm.

Due to the special structure of the composite material provided by the present invention, it has a low apparent bulk density of only 0.50–0.75 g/cm$^3$. And the volume of 17–3000 Å mesopore measured by the BET method is 0.03–0.076 ml/g, accounting for 10–35% of the total volume of the pore.

Although the composite material of the present invention contains more mesopores and macropores, it still has a large surface area, which is determined to be 280–800 m$^2$/g by the BET method, preferably 400–750 m$^2$/g. The silica/alumina ratio of the Y-zeolite contained in the composite material is 4.0–5.5 by mole.

The Y-zeolite in the above composite material is selected from the group consisting of NaY, HY, REY and REHY. When said zeolite is REY or REHY, the content of rare-earth (RE) is 0.1–15% by weight based on oxide, preferably 8.0–12.0%. The content of sodium in the composite material containing REY or REHY zeolite is less than 0.3% by weight, preferably less than 0.2% by weight.

The present invention further provides a process for preparing the composite material, comprises the following steps:

(1) Calcining and dehydrating raw material comprising kaolin at 500–690° C. to convert it into metakaolin, and then into a powder with diameters less than 230 μm;

(2) Adding sodium silicate, guide agent, solution of sodium hydroxide, and water to metakaolin powder to make a reaction feed with a ratio of (1–2.5)Na$_2$O: Al$_2$O$_3$: (4–9) SiO$_2$: wherein the ratio by weight of guide agent to metakaolin is 0.1–1.0;

(3) Crystallizing the reaction feed made in step (2) at 88–98° C. under stirring, and then filtering and drying.

The present process calcines raw material powder comprising kaolin at lower temperature to prepare metakaolin, said kaolin preferably being selected from hard kaolin or soft kaolin with an average diameter of less than 4 μm and therefore being a raw earth which has not been subjected to molding treatment. The temperature for calcining said kaolin is preferably 600–690° C., more preferably 640–680° C., and the calcination time is 1–10 hours. The content of crystal in the selected kaolin should be preferably higher than 75% by weight, more preferably higher than 85% by weight.

The calcined metakaolin must be crushed to make the diameter of all particles less than 230 μm, otherwise there would exist very rigid solid particle with a larger size in the products to be synthesized, unfavorable to the application of the product in catalytic process.

The guide agent used in above step (2) may be synthesized according to conventional processes, such as those disclosed in U.S. Pat. No. 3,574,538, U.S. Pat. No. 3,639,099, U.S. Pat. No. 3,671,19, U.S. Pat. No. 4,166,099. The composition of said guide agent is (10–17)SiO$_2$: (0.7–1.3) Al$_2$O$_3$: (11–18)Na$_2$O: (200–350)H$_2$O, and the guide agent is obtained by aging at 4–35° C., preferably at 4–20° C.

In the above raw materials for synthesis, sodium silicate may be industrial water glass or other raw materials containing silica, and sodium aluminate is sodium meta-aluminate. The concentration of the solution of sodium hydroxide is 1–10% by weight, preferably 4–6% by weight. In step (2), an auxiliary accounting for 0.1–2.5% by weight of the total raw material may be added the auxiliary being selected from the group consisting of sodium dodecyl sulfonate, hexadecyl trimethyl ammonium bromide, polyethylene glycol, oxalic acid, citric acid, sodium tartrate, or ethylenediamine tetraacetic acid (EDTA). The auxiliary is preferably added to the reaction feed after addition of guide agent.

The composite material according to present invention is a product obtained by crystallization under stirring. The stirring rate in crystallization of step (3) is 200–1000 rpm, preferably 400–600 rpm, and the time is 16–48 hours, preferably 24–32 hours. The temperature for drying the composite material after crystallization is 100–120° C.

In order to apply said composite material to the catalytic cracking of heavy oils, the NaY zeolite therein should be converted into H-type or RE ion-exchanged zeolite. The process for preparing HY zeolite is to conduct ion-exchanging of NaY with a solution of soluble ammonium salts, and then drying and calcining. The solution of soluble ammonium salts is selected from solution of ammonium chloride or ammonium nitrate, and the concentration is 4–10% by weight. The calcination temperature after drying is 500–600° C.

The process of the present invention for preparing REY is exchanging the HY zeolite made by ammonium-exchanging with a solution of soluble RE compound once, drying, calcining at 500–600° C., and then conducting ammonium exchange once to three times and drying. The soluble RE compound is preferably chloride of mixed RE, or chloride or nitrate of other RE elements. The RE element is preferably selected from lanthanum, cerium, praseodymium, neodymium, europium, or ytterbium. The property of yttrium is close to RE, so it can also be used for ion-exchange.

The composite material according to present invention is suitable for various reactions catalyzed by solid acid, especially, it can be used as an active component of the catalyst for fluidized bed catalytic cracking of heavy oils or resid. The zeolite in the composite material has higher hydrothermal stability and anti-coking ability after exchange with RE. The suitable conditions for cracking heavy oil or resid using the composite material of the present invention as a catalyst are 460–520° C., a catalyst/oil ratio of 1.0–5.0 by weight, and a mass space velocity of the feed of 16–45 $h^{-1}$.

The present invention will be described in detail below by the examples, but will not be limited by them.

The content of NaY and the unit cell size $a_0$ of the composite material are measured according to methods in ASTM D-3906 and D-3942 respectively, and the content of $RE_2O_3$ is determined using X-ray fluorescent spectroscopy.

The silica/alumina ratio in zeolite is obtained by first measuring the unit cell size $a_0$ and then calculating based on the following formula:

$$SiO_2/Al_2O_3 \text{ (mole ratio)} = 2 \times (25.858 - a_0)/(a_0 - 24.191)$$

The specific surface area and pore volume are measured using the low temperature nitrogen adsorption method (BET) according to ASTM D-3663 and D-4365 respectively, and the collapse temperature of the zeolite is determined according to differential thermal analysis (DTA).

EXAMPLE 1

Preparing Y-zeolite-containing Composite Material of the Present Invention (1) Preparation of Guide Agent:

120 g solution of sodium meta-aluminate (containing 3.15% by weight of $Al_2O_3$, 21.1% by weight of $Na_2O$) was slowly added to 250 g solution of sodium silicate (containing 20.05% by weight of $SiO_2$ and 6.41% by weight of $Na_2O$) at 30° C. under rapid stirring, and the mixture was stirred for 1 hour and then aged at 20° C. for 48 hours, yielding a guide agent having a composition of $16Na_2O$: $Al_2O_3$: 15 $SiO_2$. $320H_2O$.

(2) Preparation of Composite Material

Kaolin with a average diameter of 4 μm (Suzhou, Yangshan brand, China Kaolin Company, containing 80% by weight of crystal) was calcined at 660° C. for 3 hour, yielding metakaolin powder, which was crushed into metakaolin powder with diameters of less than 230 μm.

Under stirring, to 500 g crushed metakaolin powder was added 2000 g solution of sodium silicate (containing 20.05% by weight of $SiO_2$ and 6.41% by weight of $Na_2O$), 300 g guide agent prepared in step (1), 500 g solution of sodium hydroxide with a concentration of 5% by weight, yielding a mixture with a composition of $1.39Na_2O$: $Al_2O_3$: $5.38SiO_2$: $54.7H_2O$. This mixture was heated up to 90° C. and crystallized for 28 hours with the temperature maintaining constant under stirring at a speed of 1000 rpm. After crystallization, the crystallization tank was quenched, the solid was filtered and washed until the pH of the washing liquor was lower than 10, then dried at 120° C. for 2 hours, yielding composite material Y-1. X-ray diffraction determination shows that the content of NaY in Y-1 was 35.4% by weight, the unit cell size was 24.67, and the silica/alumina ratio was 4.96.

EXAMPLE 2

Composite material Y-2 was prepared according to the process of Example 1, except that kaolin was calcined at 680° C. for 4 hours and the stirring speed was 600 rpm in the crystallization of the reaction feed. The content of NaY in Y-2 was measured by X-ray diffraction to be 52.4% by weight and the physico-chemical properties are shown in Table 1. The X-ray diffraction pattern is shown in FIG. 1 and the images of field emission SEM with different magnification factors are shown in FIGS. 2–5.

It can be seen from the X-ray diffraction pattern in FIG. 1 that the composite material of the present invention possesses characteristic peaks of NaY, showing that it contains NaY, and the content of NaY can be calculated from the area of the characteristic peaks.

Figure 2:
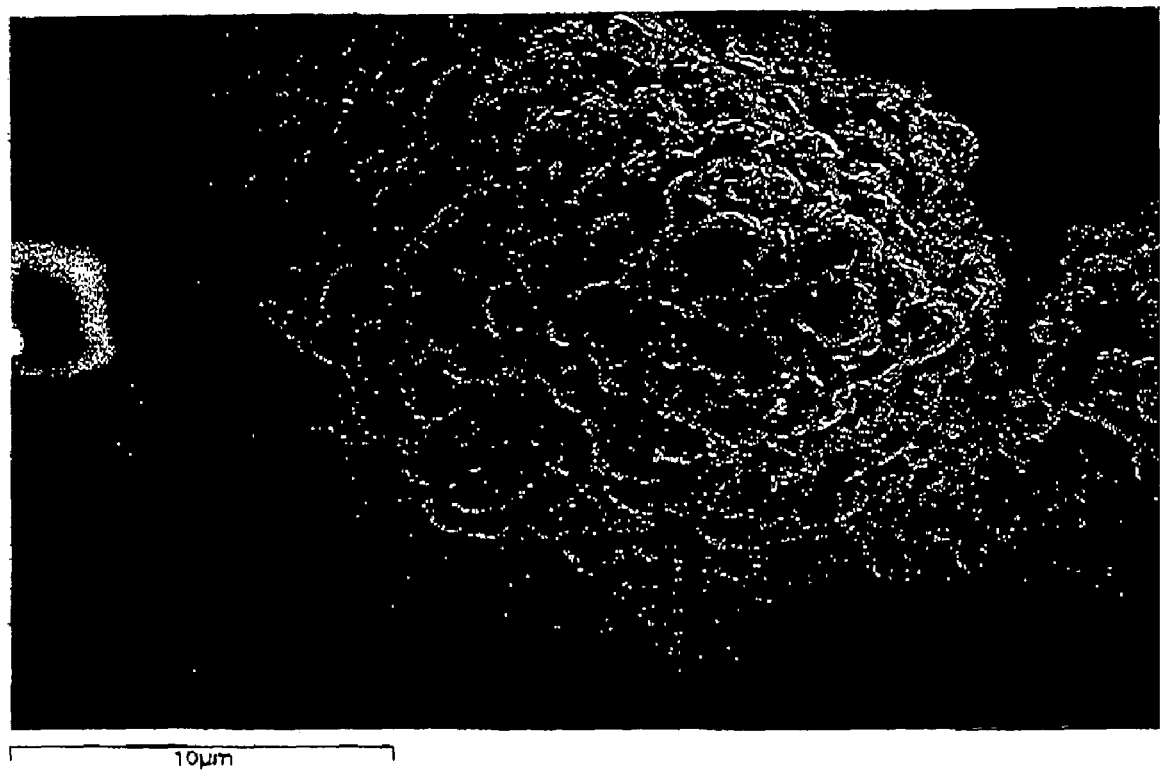
FIG. 2 is the SEM image of the composite material of the present invention magnified 5000 times.
Figure 3:
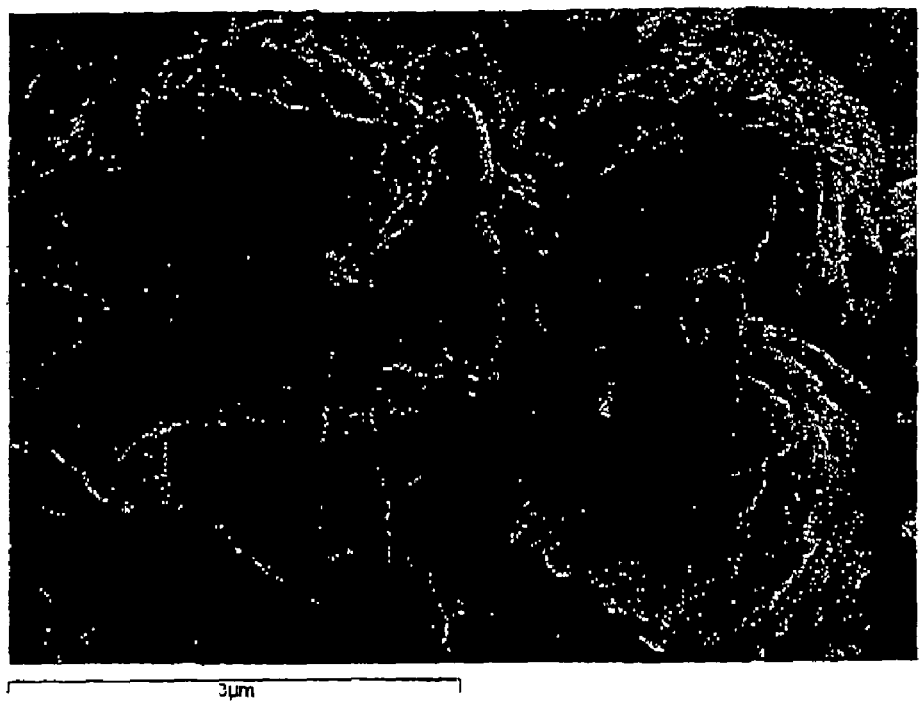
FIG. 3 is the SEM image of the composite material of the present invention magnified 20000 times.
Figure 4:
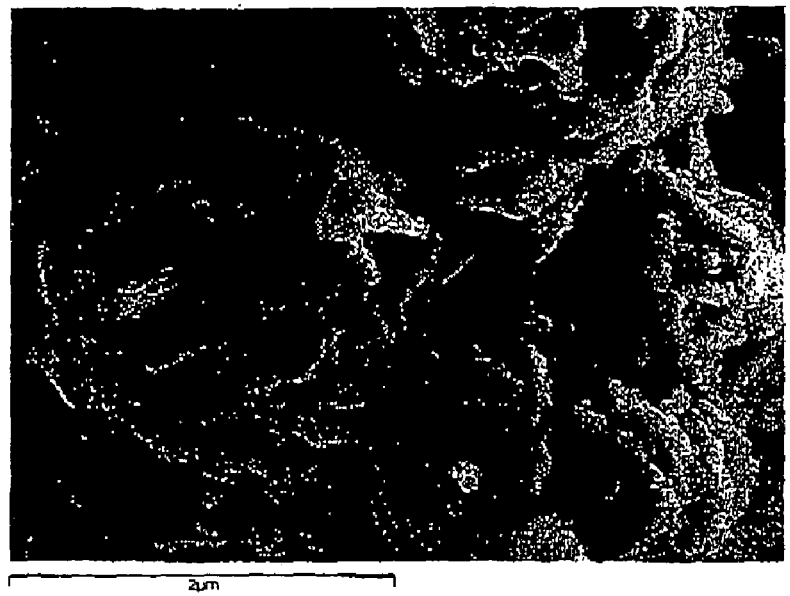
FIG. 4 is the SEM image of the composite material of the present invention magnified 30000 times.
Figure 5:
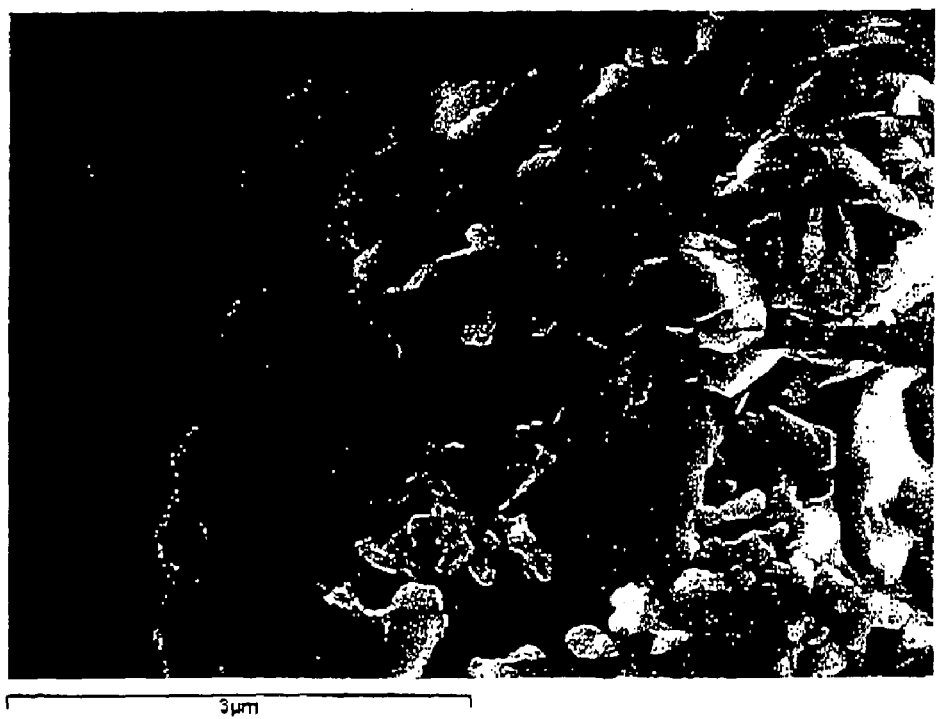
FIG. 5 is the SEM image of the composite material of the present invention magnified 20000 times.

It is clear from the SEM image of Y-2 magnified 5000 times in FIG. 2 that the composite material of the present invention consists of nest-like structure with equivalent diameters less than 3000 nm. The SAM image magnified 20000 times in FIG. 3 shows that the nest-like structure contains at lest 70% of rodlike crystal with the remainder being flaky and blocky crystals, wherein the diameter of the rodlike crystal is about 50–200 nm and length thereof is about 100–600 nm, the thickness of the flaky crystal is less than about 50–200 nm, and the equivalent diameter of the blocky crystal is about 100–500 nm. The SEM image magnified 30000 times in FIG. 4 shows that there are a great number of NaY crystals on the rodlike crystals with diameters of 40–100 nm and the flaky crystals also contain a great number of NaY crystals with diameters less than 100 nm. The SEM image magnified 20000 times in FIG. 5 is the cross section of Y-2, showing that the cross section of the nest-like structure is similar to grotto and the linkages of rodlike crystal with rodlike crystal, rodlike crystal with flaky crystal, and rodlike crystal with blocky crystal are realized by bonding. FIGS. 4 and 5 further clearly show that a great number of pores, holes and nest passages exist in the composite material of the present invention.

EXAMPLE 3

Composite material Y-3 was made according to the process of Example 1, except that the amount of added sodium silicate was 4000 g to make the composition of the feed be 2.2Na$_2$O: Al$_2$O$_3$: 8.4SiO$_2$: 80.2H$_2$O. Obtained Y-3 has a NaY content of 32.8% by weight, a unit cell size of 24.68, and a silica alumina ratio of 4.82.

EXAMPLE 4

Composite material Y4 was made according to the process of Example 1, except that add 5 g metakaolin powder, 20 g solution of sodium silicate, 2 g guide agent, 20 g in a concentration of 10% by weight of solution of sodium hydroxide, and then 0.8 g EDTA to make the composition of the feed be 2.29Na$_2$O: Al$_2$O$_3$: 5.33SiO$_2$: 87.1H$_2$O, and then crystallizing for 29 hours. The c of NaY in Y-4 was 79.6% by weight and the unit cell size was 24.68. The physico-chemical properties of Y-4 are shown in Table 1.

EXAMPLE 5

Composite material Y-5 was made according to the process of Example 1, except that add 1.1 g sodium tartrate to the reaction feed and crystallizing at 90° C. for 30 hours under stirring. Obtained Y-5 has a NaY content of 66.2% by weight, a unit cell size of 24.73, and a silica/alumina ratio of 5.26. The physico-chemical properties of Y-5 are shown in Table 1.

EXAMPLE 6

Composite material Y-6 was made according to the process of Example 1, except that add 5 g metakaolin powder, 20 g solution of sodium silicate, 4 g guide agent, 15 g solution of sodium hydroxide, and 0.15 g dodecyl sodium sulphonate to make the composition of the feed be 1.77Na$_2$O: Al$_2$O$_3$: 5.44SiO$_2$: 80.4H$_2$O. The content, of NaY in Y-6 was 82.5% by weight a unit cell size was 24.71. The physico-chemical properties of Y-6 are shown in Table 1.

EXAMPLE 7

Composite material Y-7 was made according to the process of Example 1, except that add 5 g metakaolin powder, 15 g solution of sodium silicate, 1.7 g guide agent, 15 g solution of sodium hydroxide to make the composition of the feed be 1.32N$_2$O: Al$_2$O$_3$: 4.55SiO$_2$: 67.7H$_2$O. Obtained Y-7 has a NaY content of 63.3% by weight, a unit cell size of 24.65, and a silica/alumina ratio of 5.26.

EXAMPLE 8

Composite material Y-8 was made according to the process of Example 1, except taht add 5 g metakaolin powder, 15 g solution of sodium silicate, 3.0 g guide agent, 15 g solution of sodium hydroxide to make the composition of the feed be 1.44Na$_2$O: Al$_2$O$_3$: 4.63SiO$_2$: 71.1H$_2$O. Obtained Y-8 has a NaY content of 75.0% by weight, a unit cell size of 24.68, and a silica/alumina ratio of 4.82.

COMPARATIVE EXAMPLE

Figure 6:
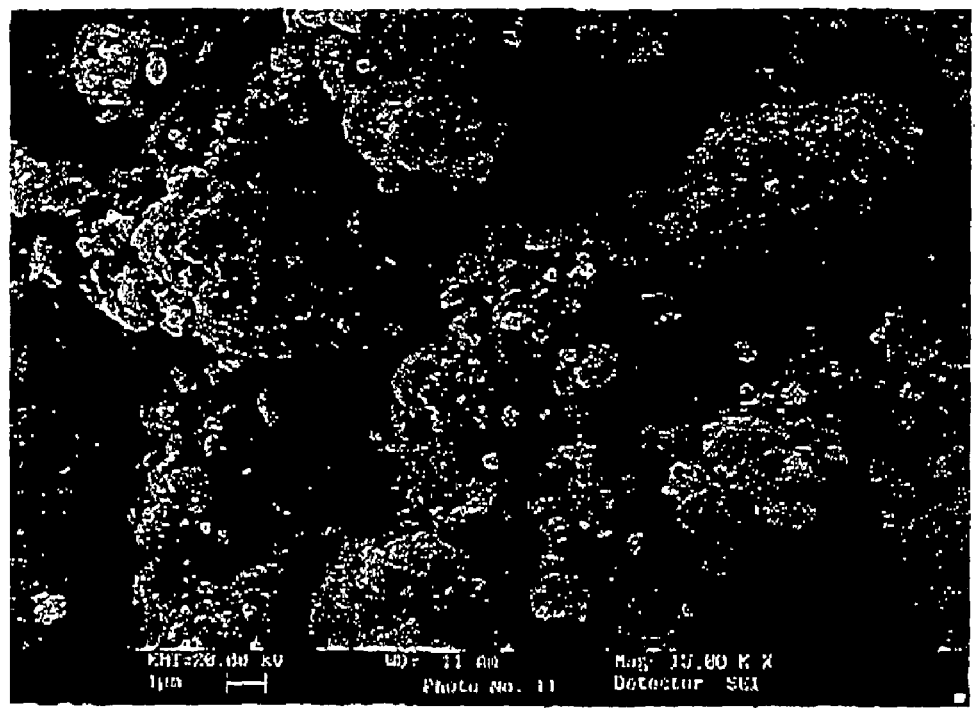
FIG. 6 is the SEM image of the composite material made from kaolin calcined at a higher temperature magnified 15000 times.

Kaolin was calcined at 870° C. for 2 hours according to the process of CN 1334142A and then Y-9 was made according to the process of Example 1. The content of NaY in Y-9 was 80% by weight and the silica/alumina ratio was 4.72. The SEM image of Y-9 is shown in FIG. 6, which indicates that Y-9 has no nest-like structure.

EXAMPLES 9–13

Preparing REY-containing composite material of the present invention 100 g NH$_4$Cl and 1000 g deionized water were added to 100 g composite material containing NaY zeolite prepared according to the present invention, and the mixture was stirred at 90° C. for 2 hours. The solid was washed and filtered, and then dried at 120° C. for 2 hours, yielding a composite material containing NH$_4$Y zeolite.

Deionized water was added to 100 g composite material containing NH$_4$Y zeolite in a ratio of NH$_4$Y: RE$_2$O$_3$: H$_2$O of 1: 0.1: 10 and the pH value was adjusted to 4.5 with dilute hydrochloric acid. Then solution of mixed RE chloride was added and ion-exchange proceeded at 90° C. under stirring for 2 hours. After filtering and washing, the collected solid was calcined at 560° C. for 2 hours. A mixture with a ratio of REY: NH$_4$Cl: H$_2$O=1: 0.3;10 was made and subjected to ammonium-exchange at 90° C. under stirring for 1 hour. The solid was filtered, washed, and dried at 120° C. for 2 hours. The ammonium-exchange was repeated once under the same condition yielding REY-zeolite-containing composite material with a content of sodium oxide below 0.3% by weight. The content of REY in the composite material, corresponding number, and the number of the feed used in various examples are shown in Table 2.

EXAMPLE 14

REY-containing composite material of the present invention was aged at 810° C. for 8 and 17 hours respectively with 100% steam, and then dried and evaluated for its catalytic performance with light oil having a boiling range of 239–351° C. in a micro-reactor. The results are shown in Table 3.

It can be seen from Table 3 that the composite material according to the present invention still has a high hydrothermal stability after severe aging treatment. This is reflected by the high activity in the micro-reactor. The high activity of the composite material of the present invention is due to it has a nest-like structure, so that various crystals can not completely pile up between each other and there exit many gaps and spaces, favorable to the diffusion and transfer of heat. Meanwhile, as zeolite crystal grows on the surface of the amorphous silica/alumina matrix formed after crystal transformation of kaolin, which matrix not only can disperse the heat on the zeolite crystal, but also can dilute the concentration of sodium oxide on the crystal, thereby enhancing the thermal stability.

EXAMPLE 15

The present example illustrates the catalytic performance of the composite material of the present invention for cracking heavy oil in a micro-reactor.

Catalyst REY-1, REY-3, and REY-5 were aged at 810° C. for 17 hours with 100% steam and then evaluated for catalytic performance in a micro-reactor device of heavy oil. The loading of the catalyst was 2 g. The properties of the feed oil are shown in Table 4. The results obtained at a reaction temperature of 500° C., catalyst/oil ratio of 1.18, and mass space velocity of 43.71 h$^{-1}$ are shown, in Table 5, wherein the end point of gasoline was 220° C. and that of diesel oil was 330° C.

The data in Table 5 indicate that compared to the comparative catalyst, REY-5, the composite materials according to the present invention exhibited higher conversion, higher yield of light oils, lower yield of dry gas and coke even after extremely sever aging treatment, showing that the composite materials according to the present invention have a high hydrothermal stability and a strong ability to crack heavy oils.

The present application claims priority under 35 U.S.C. §119 of Chinese Patent Application No. 03121159.3 filed on Mar. 28, 2003. The disclosure of the foregoing application is expressly incorporated by reference herein in its entirety.

TABLE 1

| | No. of composite material | | | |
|---|---|---|---|---|
| | Y-2 | Y-4 | Y-5 | Y-6 |
| NaY content, wt % | 52.4 | 79.6 | 86.6 | 82.5 |
| Silica/alumina, mole ratio | 5.2 | 4.8 | 4.96 | 4.4 |
| Unit cell size, Å | 24.65 | 24.68 | 24.67 | 24.71 |
| Specific surface area, m$^2$/g | 470.5 | 558.3 | 750.3 | 623.0 |
| BET total pore volume, ml/g | 0.22 | 0.25 | 0.37 | 0.34 |
| 17–3000 Å pore volume, ml/g | 0.061 | 0.039 | 0.040 | 0.07 |
| Apparent bulk density, g/cm$^3$ | 0.65 | 0.55 | 0.40 | 0.60 |
| Structure collapse temperature, °C. | 896 | 902 | 923 | 893.8 |

TABLE 2

| | Example No. | | | | |
|---|---|---|---|---|---|
| | 9 | 10 | 11 | 12 | 13 |
| Feed No. | Y-2 | Y-6 | Y-7 | Y-8 | Y-9 |
| No. of composite material | REY-1 | REY-2 | REY-3 | REY-4 | REY-5 |
| Contents of substances in composite material, wt % | | | | | |
| Na$_2$O | 0.25 | 0.17 | 0.13 | 0.16 | 0.23 |
| RE$_2$O$_3$ | 9.5 | 10.7 | 10.0 | 10.0 | 10.0 |
| SiO$_2$ | 65 | 64 | 65 | 63 | 65 |
| Al$_2$O$_3$ | 25 | 24 | 24 | 23 | 24 |

TABLE 3

| | No. of material | | | | |
|---|---|---|---|---|---|
| Treating condition | REY-1 | REY-2 | REY-3 | REY-4 | REY-5 |
| | Activity, wt % | | | | |
| 810° C., steam, 8 hours | 80 | 72 | 86 | 82 | 70 |
| 810° C., steam, 17 hours | 75 | 66 | 79 | 72 | 61 |

TABLE 4

| 20° C. density, g/cm$^3$ | 0.8916 |
|---|---|
| Viscosity, mm$^2$/s | 9.629 (80° C.) |
| | 6.312 (100° C.) |
| Freezing point, ° C. | 47 |
| Carbon residue, wt % | 0.28 |
| Boiling point, ° C. | |
| Initial | 288 |
| 90% | 518 |

TABLE 5

| | Catalyst No. | | |
|---|---|---|---|
| | REY-3 | REY-4 | REY-5 |
| Material balance, wt % | | | |
| Dry gas | 0.56 | 0.84 | 1.2 |
| LPG | 9.6 | 8.77 | 14.4 |
| Gasoline | 60.98 | 57.97 | 51.8 |
| Diesel oil | 15.01 | 15.82 | 13.8 |
| Heavy oil | 12.56 | 15.67 | 17.0 |
| Coke | 1.3 | 0.98 | 1.8 |
| Conversion, wt % | 72.43 | 68.51 | 69.0 |
| Light oil, wt % | 75.99 | 73.79 | 65.6 |
| Light oil + LPE, wt % | 85.59 | 82.56 | 80.0 |
| Coke/conversion | 0.018 | 0.014 | 0.026 |

The invention claimed is:

1. A Y-zeolite-containing composite material, comprising a nest structure, said composite material comprising 30–85% Y-zeolite by weight and being matrix formed after crystallization of kaolin, and the crystal size of said Y-zeolite is in a range of 10–400 nm, and an equivalent diameter of said nest structure is in a range of 1000–3000 nm.

2. The composite material according to claim 1, wherein said composite material is made from materials comprising the kaolin by in-situ crystallization.

3. The composite material according to claim 2, wherein said materials comprising the kaolin is selected from hard kaolin or soft kaolin.

4. The composite material according to claim 3, wherein the content of Y-zeolite is in the range of 30–70% by weight of the composite material.

5. The composite material according to claim 1, wherein said nest structure is comprised of at least 70% of rod crystal, wherein said rod crystal has a diameter of 50–200 nm and a length of 100–600 nm.

6. The composite material according to claim 5, wherein the nest structure further comprises flaky crystal or blocky crystal, wherein the blocky crystal has an equivalent diameter of about 50–500 nm and the flaky crystal has a thickness of about 50–200 nm.

7. The composite material according to claim 5, wherein said rod crystal, flaky crystal and blocky crystal are comprised of matrix formed after in-situ crystallization of the materials comprising kaolin and Y-zeolite on a surface of said matrix.

8. The composite material according to claim 1, wherein an apparent bulk density of the composite material is 0.50–0.75 cm$^3$ and a surface area is 280–800 m$^2$/g.

9. The composite material according to claim 1, wherein a volume of 17–3000 Å mesopore measured by BET method is 0.03–0.076 ml/g, accounting for 10–35% of a total volume of the pore.

10. The composite material according to claim 1, wherein an SiO$_2$/Al$_2$O$_3$ ratio in Y-zeolite is 4.0–5.5 by mole.

11. The composite material according to claim 1, wherein said Y-zeolite is selected from the group consisting of NaY, HY, REY and REHY.

12. A process for preparing the composite material according to claim 1, comprising the following steps:
(1) calcining and dehydrating kaolin at 500–690° C. to convert it into metakaolin, and then into a powder with diameters less than 230 μm;
(2) adding sodium silicate, guide agent, solution of sodium hydroxide, and water to metakaolin powder to make a reaction feed with a ratio of $(1-2.5)Na_2O$: $Al_2O_3$: $(4-9)SiO_2$: $(40-100)H_2O$, wherein a ratio by weight of the guide agent to the metakaolin is 0.1–1.0;
(3) crystallizing the reaction feed made in step (2) at 88–98° C. under stirring, and then filtering and drying.

13. The process according to claim 12, wherein the composition of said guide agent in step (2) is $(10-17)SiO_2$: $(0.7-1.3)Al_2O_3$:$(11-18)$ $Na_2O$: $(200-350)H_2O$, and the guide agent is made by aging at 4–20° C.

14. The process according to claim 12, wherein the temperature for calcining raw material powder in step (1) is in a range of 600–690 ° C.

15. The process according to claim 12, wherein a stirring rate for crystallization in step (3) is 200–1000 rpm and a crystallization time is 16–48 hours.

16. The process according to claim 12, wherein a concentration of the added solution of sodium hydroxide in step (2) is 1–10% by weight.

17. The process according to claim 12, wherein said kaolin in step (1) is selected from hard kaolin or soft kaolin, containing more than 75% by weight of crystal.

18. The process according to claim 12, wherein an auxiliary accounting for 0.1–2.5% by weight of the total reaction feed is further added to the feed in step (2), and the auxiliary is selected from the group consisting of sodium dodecyl sulfonate, hexadecyl trimethyl ammonium bromide, polyethylene glycol, oxalic acid, citric acid, sodium tartrate, and ethylenediamine tetraacetic acid.

19. A process for preparing the composite material according to claim 1, comprising the following steps:
(1) calcining and dehydrating kaolin at 500–690° C. to convert it into metakaolin, and then into a powder with diameters less than 230 μm;
(2) adding sodium silicate, guide agent, solution of sodium hydroxide, and water to metakaolin powder to make a reaction feed with a ratio of $(1-2.5)Na_2O$: $Al_2O_3$: $(4-9)SiO_2$: $(40-100)H_2O$, wherein said guide agent is made by aging at 4–20° C. and a ratio by weight of the guide agent to the metakaolin is 0.1–1.0;
(3) crystallizing the reaction feed made in step (2) at 88–98° C. under stirring, and then filtering and drying.

* * * * *